May 7, 1935.  D. A. CARPENTER  2,000,217
ELASTIC COUPLING
Original Filed Feb. 23, 1932  3 Sheets-Sheet 1

INVENTOR
Daniel A. Carpenter

May 7, 1935.  D. A. CARPENTER  2,000,217
ELASTIC COUPLING
Original Filed Feb. 23, 1932  3 Sheets-Sheet 2
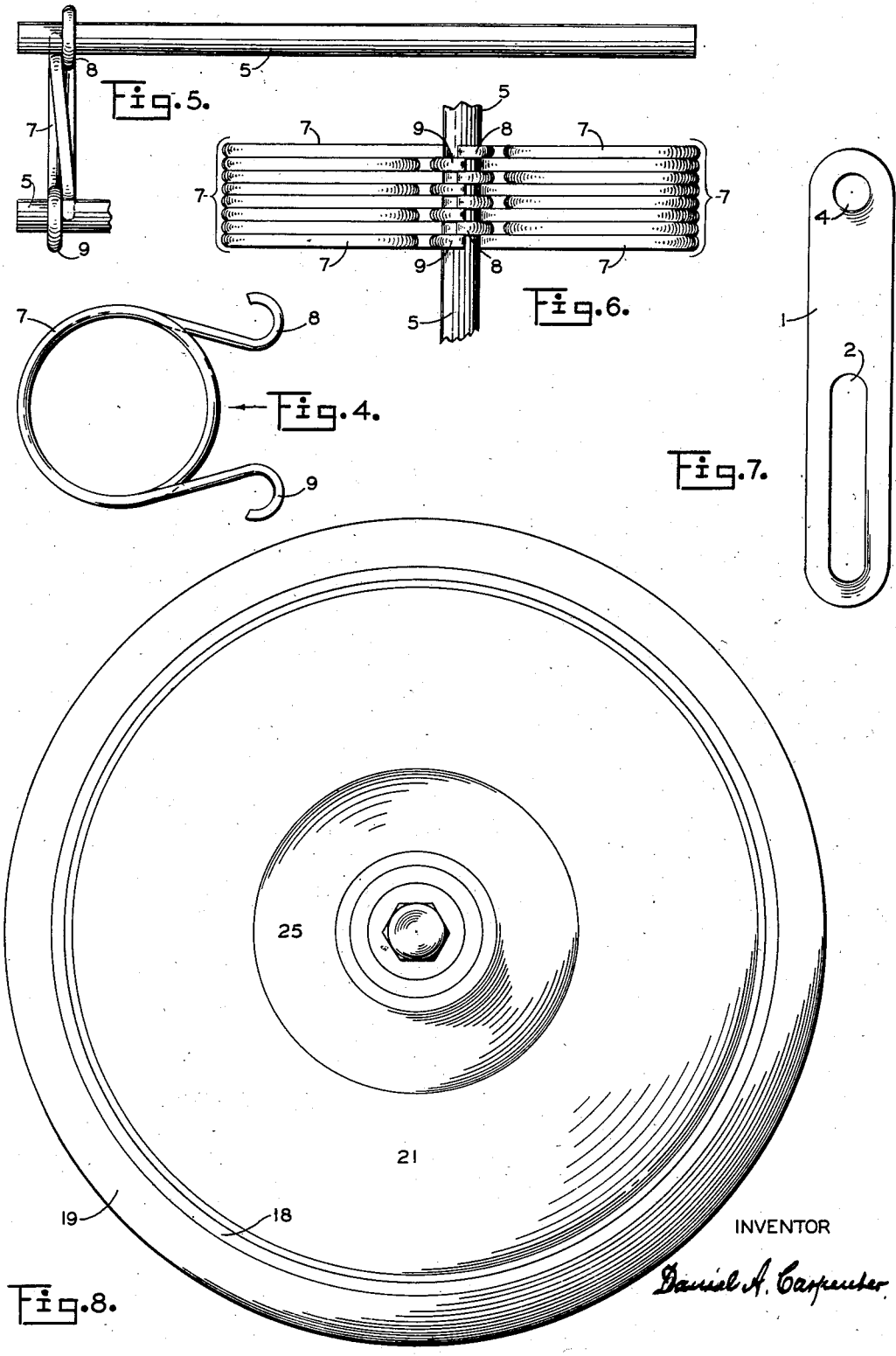
INVENTOR
Daniel A. Carpenter May 7, 1935. D. A. CARPENTER 2,000,217
ELASTIC COUPLING
Original Filed Feb. 23, 1932 3 Sheets-Sheet 3

INVENTOR
Daniel A. Carpenter

Patented May 7, 1935

2,000,217

UNITED STATES PATENT OFFICE 2,000,217

ELASTIC COUPLING

Daniel A. Carpenter, New York, N. Y.

Application February 23, 1932, Serial No. 594,761
Renewed October 11, 1934

16 Claims. (Cl. 267—58)

This invention relates to improvements in elastic couplings which comprise metal springs. Objects of it are to better such couplings in construction and mode of operation and to render them fit for new uses. Couplings embodying it may be utilized in structures of various forms, sizes and weights, in which structures the couplings may do heavy or light work in supporting loads, transmitting power, resisting pressure and tensile stress, and in acting as shock-absorbers. The invention consists of an elastic coupling in which novel spring-holding and spring-flexing gear and a novel composite spring are combined and which is hereinafter described and claimed.

Figures 1, 2, 3:
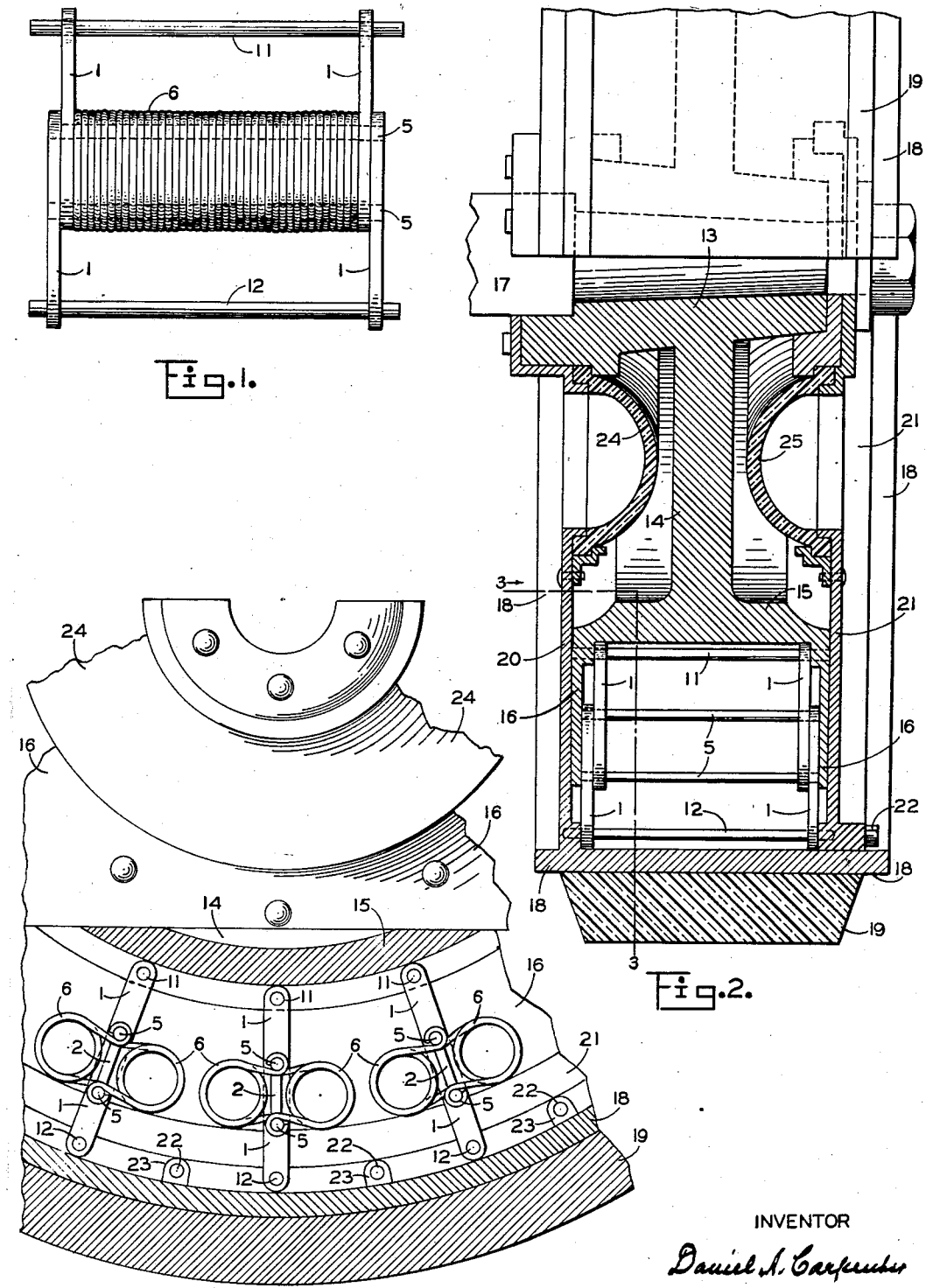
Figure 9:
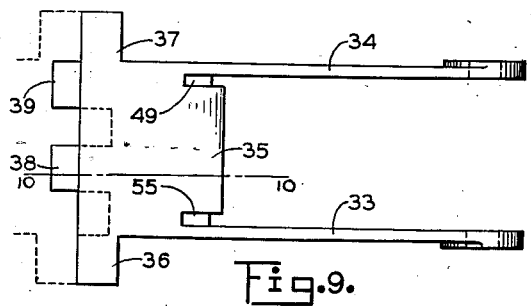
Figure 11:
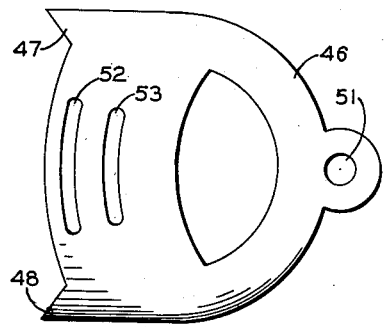
Figure 10:
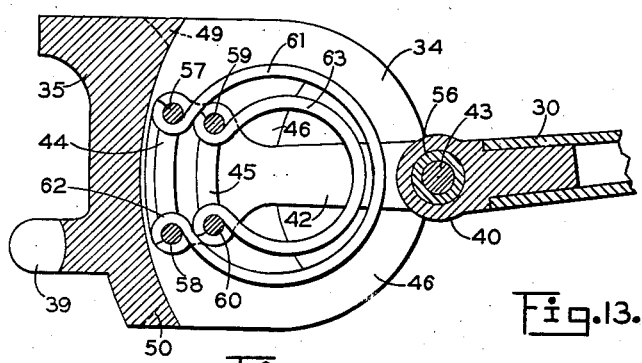
Figure 12:
Figure 13:
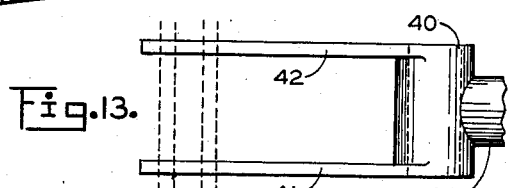
Figure 15:
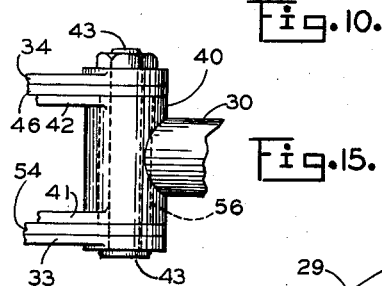
Figure 14:
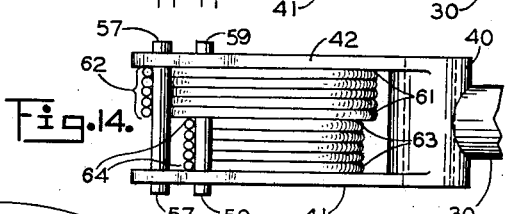

In the accompanying drawings, in which like reference-numerals designate like parts in different views, and which illustrate couplings that embody the invention in two forms, one comprised in a truck-wheel or bus-wheel and the other in the support of the main frame of an automobile:

Fig. 1 is a side elevation of the form of coupling that is contained in the wheel, the composite spring consisting of coiled wire components;

Fig. 2, a sectional elevation of a portion of the wheel, in which this and other like couplings are embodied, the plane of the section containing the axis of the wheel, Fig. 3, a sectional elevation of a fragment of the wheel, the plane of the section being at right angles to the axis and containing the line 3—3 Fig. 2, and the direction of the view being indicated by the arrow at the left of the figure;

Fig. 4, a side view of one of the coiled wire springs which are components of the composite spring represented in Fig. 1;

Fig. 5, an edge view thereof and a side view of a rod and fragment of another rod which rods the coupling embodies, the direction of the view being indicated by the arrow at the right of Fig. 4;

Fig. 6, a plan of a group of eight coiled wire springs like that represented in Figs. 4 and 5;

Fig. 7, a face view of one of the bars of which edge views are shown in Fig. 1, and which are components of the spring-holding and spring-flexing gear;

Fig. 8, a view of the outer face of the wheel;

Fig. 9, a plan of a bracket which is included in the other form of coupling;

Fig. 10, a sectional elevation of a portion of this coupling, which portion includes this bracket, the sectional plane containing the line 10—10, Fig. 9;

Fig. 11, a face view of a slotted plate included in the spring-holding and spring-flexing gear;

Fig. 12, an edge view of this plate;

Fig. 13, a plan of a fragment of the lever which is cut lengthwise by the plane of Fig. 10, this fragment including the inner arm of the lever, which arm has two branches, one of which is shown in Fig. 10;

Fig. 14, a plan of that fragment and some components of the composite spring;

Fig. 15, a fragmental view of details of construction; and

Figure 16:
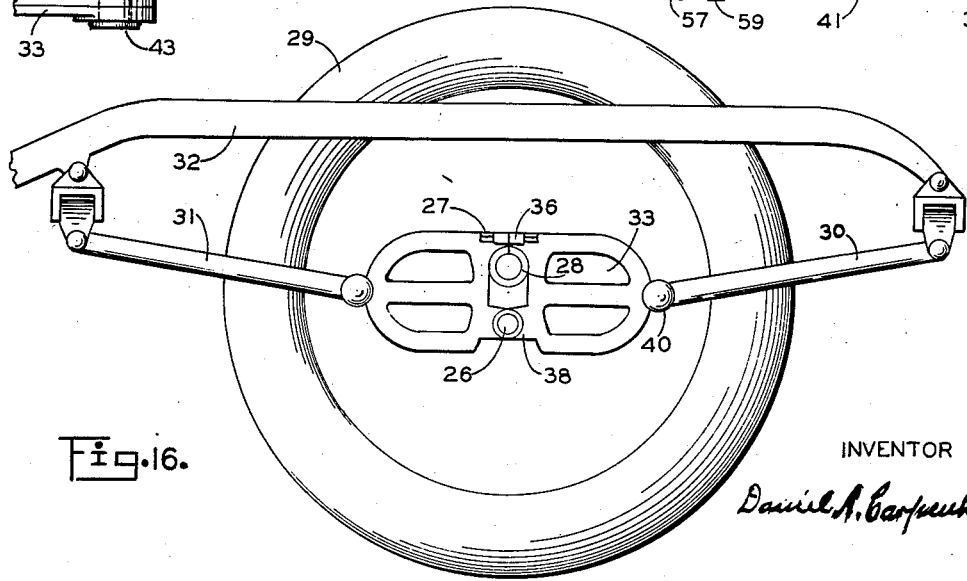

Fig. 16, a side elevation of a wheel and fragment of the main frame of an automobile, and a pair of couplings which are comprised in the support of the frame.

The spring-holding and spring-flexing gear of each of the illustrated forms of the coupling comprises components which are relatively movable and adapted to be attached to objects that are to be connected together by the coupling.

The gear of the particular coupling that is represented in Fig. 1 is composed of four bars and two rods. Each of these bars is a duplicate of the bar 1 shown in Fig. 7. In it are the slot 2 and the hole 4. Each of the rods, 5, 5, is a duplicate of the other. The composite spring 6 of this coupling consists of a set of components each of which is a duplicate of the coiled wire spring 7 shown in Figs. 4 and 5. The approximately semicircular bends 8 and 9 at its ends fit loosely on the rods 5 5.

The scale of Fig. 7 is the same as that of Figs. 4, 5 and 6, twice that of Fig. 1, three times that of Figs. 2 and 3, and four times that of Fig. 8, the diameter of the entire wheel which the last-named figure represents being thirty-six inches.

The rods 5 5 pass through the slots in the bars arranged as shown (Figs. 1 and 3) and each component of the spring 6 is connected to these rods by the bends 8 and 9, and the spring is stressed so that it keeps these rods at the ends of the slots except when it is flexed by a force or forces acting on the coupling and pushing or drawing one or each of the rods towards the other. Rods 11 and 12 pass through the holes 4 in the bars 1.

The spring 6 is composed of two groups of components 7, the coils of which groups constitute symmetrical formations (Fig. 6) between which passes the plane that contains the axes of the rods 5 5. The wires are arranged in pairs, one wire of each pair being in one group and the other wire being in the other group, and each pair being bisected by a plane that is perpendicular to the axes of the spring-holding rods and that passes between the bends 8 and 9 of each component of the pair. Four pairs are represented in Fig. 6, each pair including two bends 8 and two bends 9. One bend 8 and one bend 9 are connected to the upper rod and the other bends are connected to the lower rod, and the bend 8 of one component and bend 9 of the other are directly over the other bends 8 and 9 respectively of the pair.

The composite spring 6 (Fig. 1) consists of twenty pairs of coiled wire components 7 (Fig. 4). Obviously a similar spring may be composed of a larger or smaller number of pairs, the components of similar springs may be wires of many diameters, and the sizes of the coils may differ in springs made of wire of any particular diameter, a single composite spring may consist of wires of different diameters, and the components of a spring may be variously stressed. Hence the strength and elasticity of the springs may be widely varied.

A coupling having the construction and dimensions represented in Figs. 1 and 4-7, the spring being made of music-wire and adequately stressed, will transmit several hundred pounds of pressure or tensile force. If the spring is subjected to pressure that forces either or each of the rods 11 and 12 towards the other, or to tensile force that draws either or each of those rods from the other, so that the coupling is either shortened or extended, the spring is flexed by the action of the bars 1 on the rods 5, 5 and that of the rods 5, 5 on the spring, one or each rod 5 then sliding in the slots 2 of two of the bars 1. The spring may be so flexed until the wire bends 8 and 9 on one of the rods are brought into contact with the wire bends 8 and 9 on the other rod.

Eighteen couplings, each a duplicate of that above described, are contained in the wheel the construction of which is illustrated in Figs. 2 and 3. The hub 13, web 14, and rim 15 having the flanges 16 with flat and smooth outer faces, are a rigid unit. They may be formed together or separately formed and fastened together. The axle 17 may or may not turn with the wheel. The rim 18 to which is affixed the rubber tread 19 is the rim proper of the wheel. It surrounds the inner rim 15, and the plates 20 and 21 extending inwardly from it and attached to it and having flat and smooth inner faces form lateral annular walls between which the inner rim is confined and is movable radially and angularly, the plates 20 and 21 guiding it by acting on the flanges 16. One of these plates is detachable from the rim 18 while the other is preferably formed on or permanently fastened to the rim. Plate 21 is shown attached by bolts 22 to lugs 23 on the outer rim, and if the bolts are removed may be pulled out of rim 18.

Each coupling is inserted between the flanges 16 and attached to them by a rod 11. The rod is pushed through a hole in one of the flanges 16, then through the holes 4 in the bars 1 that reach to the inner end of the coupling, and then into a hole in the other flange 16. Thereafter the ends of the rod are in the flanges and may be between or in the planes of their outer faces. The outer rim is pushed over the inner rim and couplings, or they are pushed into it, then the couplings are connected to the plate 20 by means of the rods 12, and then the plate 21 is put on and fastened by the bolts 22. The rods 12 pass through the bars 1 that extend to the inner surface of the rim 18 and they fit in holes in the plates 20 and 21. The concavo-convex rings 24 and 25 are attached at their outer edges to the plates 20 and 21 respectively and connected with the hub by means which enables them readily to be detached from it. They prevent dirt from getting into the spaces between the hub and inner rim. They are elastic or flexible for they must yield whenever the inner rim so moves as to change its relation to the outer rim.

All of the couplings coact in supporting the load imposed on the rim 18, except when the axes of the rods 5, 5 of a coupling, or of each of two couplings, are in a horizontal plane, couplings being subjected to tensile stress when their outer ends are above that plane and to pressure when their outer ends are below that plane, and of course the portion of the load supported by each coupling continually varies as the wheel rotates. When the load is not great enough to flex the springs if the wheel is not turning, the axis of the hub and that of the cylindrical rim 18 coincide. They may be separated momentarily by jolting of the load as the wheel rolls on the road.

While the gear and spring of the other illustrated form of the coupling severally differ in appearance from those composing the above-described form, yet these two forms of the coupling are essentially alike in respect of their main features of construction and their modes of operation.

Two couplings of the form to be described are represented in Fig. 16. They coact in supporting the load. They are hinged together by the pin 26 and fastened by two bolts, one of which is the bolt 27, to axle-case 28 of the wheel 29. The arms 30 31 to which the main frame 32 is attached are components of the spring-holding and spring-flexing gear. The side 33 of the rear coupling is the side 33 of the bracket represented in Fig. 9, this side and the other side 34 of the bracket being alike in size and shape. They are formed on the base 35 of the bracket on which are a pair of upper lugs 36 37 and a pair of lower lugs 38 39. The brackets of the couplings represented in Fig. 16 fit together as indicated in that figure and in Fig. 9, a portion of the outline of the front bracket being shown by dotted lines in Fig. 9. The pin 26 (Fig. 16) passes through the lugs 38 39 of each bracket and the bolt 27 and another like it pass through the lugs 36 37.

The arm 30, the hub 40 and the parallel arms 41 42 are fast together (Figs. 16, 10, 13, 14, 15). When the coupling is finished they form a lever mounted on the bolt 43 which passes through hub 40 and the sides 33 and 34 of the bracket (Figs. 10, 15), the arms 41 42 being within the bracket and the lever being supported by it. The outline of arm 41 is the same as that of arm 42 (Figs. 10 13) and in 41 are slots like the slots 44 45 in arm 42.

The front and rear sides of each of these four slots are curved surfaces, their lateral edges being arcs and the centers of the circles containing them being on the axis of bolt 43.

The flat plate 46 (Figs. 11, 12) fits loosely between side 34 of the bracket and arm 42 of the lever. The lugs 47 48 of the plate extend into the recesses 49 50 in the bracket, and bolt 43 passes through hole 51 in the plate. The slots 52 53 in the plate are like the slots 44 45 respectively in arm 42 of the lever and register with them respectively when the lever is in its normal position, shown in Fig. 10. Another flat plate 54 (Fig. 15), a duplicate of plate 46, is confined between side 33 of the bracket and arm 41 of the lever by bolt 43 passing through it, and by the lugs extending into recesses in the bracket, one of these being the recess 55 (Fig. 7) and the other being similar to recess 50 (Fig. 10) and being at the bottom of the bracket under recess 55.

The sleeve 56 extends through the hub 40, surrounding bolt 43 and fitting loosely in the hub, and is in contact at its ends with the plates 46 and 54. The sleeve is slightly longer than the hub, so that although the sides of the bracket, the plates 46 and 54 and the sleeve are tightly bolted together the hub may turn freely on the sleeve.

The rods 57 and 58 pass through slot 44 in arm 42 of the lever, and through the corresponding slots in arm 41 and plates 46 and 54. The rods 59 and 60 pass through slot 45 in arm 42 of the lever and through the corresponding slots in arm 41 and plates 46 and 54. These four rods are alike and are loose in the slots.

A stressed composite spring consisting of ten wire bows 61 is connected at its ends to rods 57 and 58. Five of these bows are shown in Fig. 14, each having bends forming hooks 62 at its ends which hooks fit on the rods 57 and 58. Another stressed composite spring consisting of ten wire bows 63 is connected at its ends to rods 59 and 60. Five of these bows are shown in Fig. 14, each having bends forming hooks 64 at its ends which hooks fit on the rods 59 and 60.

The wire composing the springs of a coupling is of such size and the springs are so stressed that the weight supported by the coupling does not further bend the springs when the automobile is not loaded or moving. Then the springs keep rods 57 and 59 at the upper ends of the slots in plates 46 and 54, and keep rods 58 and 60 at the lower ends of those slots, and arms 41 and 42 of the lever are kept in their normal positions by the action of rods 58 and 60 on the lower ends of the slots in the arms, each of those slots then registering from end to end with the corresponding slots in plates 46 and 54. The weight imposed on arm 30 of the lever acts on rods 58 and 60, arms 41 and 42 tending to raise them against the action of the springs. When the springs are flexed by the action of the lever on those rods which then move upward, rods 57 and 58 are prevented from moving upward by the tops of the slots in plates 46 and 54. If the load rebounds after a jolt so that the outer end of arm 30 of the lever is drawn above its normal position its movement upward from that position is resisted by the springs, arms 41 and 42 of the lever then pulling down rods 57 and 59 and flexing the springs, which cannot force rods 58 and 60 downward for they are then at the lower ends of the slots in plates 46 and 54.

Those plates are held tight in the bracket by the bolt 43 and lugs 47 and 48 acting on the base of the bracket in the recesses above described.

The lever, rods, springs, sleeve 56 and plates 46 and 54 may be assembled into a unit before the lever is mounted in the supporting bracket. The portion of this unit that belongs in the bracket may be pushed into and adjusted in the bracket and then the unit and bracket may be bolted together. The top and bottom of the bracket may be closed by covers fitting tightly on the sides 33 and 34 and touching hub 40 of the lever from side to side of the bracket, so that the interior thereof may form a closed chamber protecting the springs from dirt and the weather and, if desired, containing lubricant for the springs and gear.

The gear of a coupling embodying the invention may be pivotally attached to both objects which it connects together, as it is in the described wheel (Fig. 3), or a component of the gear may be pivotally attached to one of the objects, and another component may be tightly affixed to the other object as the described bracket is fastened to the axle-case of the automobile.

Although the foregoing description is intended fully to explain the claimed invention, it is believed to be evident that it may be embodied in forms differing from those that have been particularly described, and put to uses not mentioned herein but made obvious by common knowledge of many other forms of elastic couplings.

A composite spring may consist of many or few components and the spring-holders of couplings may be devices differing in form from the spring-holding rods shown herein.

The springs of couplings may be variously held at their ends on the spring-holders.

A composite spring embodying the invention may be very strong and yet be more elastic than a spring that consists of but one piece of metal and that is as strong as and not bigger than the composite spring.

When the form of a spring is that represented in Figs. 1 and 3, a coupling comprising the spring may be fitted for uses not commonly, if ever, made of elastic couplings, by virtue of the peculiarity of the spring in respect of relations between its size, strength and elasticity, and of its symmetry and smoothness of action.

What is claimed is:

1. An elastic coupling embodying the combination of spring-holding and spring-flexing gear and a composite metal spring, which gear comprises a pair of relatively movable spring-holders and devices that support the holders and spring and form holder-guides, the spring-holders having parallel longitudinal axes, and which spring is composed of bent components severally held at their ends on and suported by the spring-holders and arranged close together in a group that extends lengthwise of the spring-holders and throughout its length is contiguous to each of them and projects from the plane that contains their said axes, and from the ends of which group the spring-holders project and extend to their supporting devices, and which spring exerts pressure that is transmitted to said devices by the spring-holders constantly acting on the guides, and acting on each guide at both ends unless spring-flexing force is applied to the coupling.

2. An elastic coupling embodying the combination of spring-holding and spring-flexing gear and a composite metal spring, which gear comprises a pair of relatively movable spring-holders, and holder-supporting and holder-guiding devices that form flat-faced guides in which each spring-holder is confined, the spring-holders having parallel longitudinal axes that pass through the guides and are perpendicular to the planes of their faces, and which spring is composed of bent components severally held at their ends on and supported by the spring-holders and arranged close together in a group that extends length-wise of the spring-holders and throughout its length is contiguous to each of them and projects from the plane that contains their said axes, and from the ends of which group the spring-holders project and extend to their supporting devices, and which spring exerts pressure that is transmitted to said devices by the spring-holders constantly acting on the guides and acting on each guide at both ends unless spring-flexing force is applied to the coupling.

3. An elastic coupling embodying the combination of spring-holding and spring-flexing gear and a composite metal spring, which gear comprises a pair of relatively movable spring-holders and devices that support the holders and spring and form holder-guides, the spring-holders having parallel longitudinal axes, and which spring is composed of coiled wires severally held at their ends on and supported by the spring-holders and arranged close together in a group which extends lengthwise of the spring-holders and projects from the plane containing their said axes and the wires of which are close together on the spring-holders throughout the length of the group, and from the ends of which group the spring-holders project and extend to their supporting devices, the coils of the wires being close-wound spirals the axes of which are parallel to those of the spring-holders.

4. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and which spring is composed of bent components supported by the spring-holders and arranged close together in a group which extends lengthwise of the spring-holders and from the ends of which the spring-holders project and extend to their supporting and guiding devices.

5. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and which spring is composed of coiled wires severally held at their ends on and supported by the spring-holders and arranged close together in a group that extends along the spring-holders and forms symmetrical projections at the sides of the plane that contains their said axes, and from the ends of which group the spring-holders project and extend to their supporting and guiding devices.

6. An elastic coupling embodying the combination of spring-holding and spring-flexing gear and a composite metal spring, which gear comprises a pair of parallel and relatively movable spring-holding rods and rod-supporting and rod-guiding devices, and which spring consists of bent wire components each having at its ends rod-fitting bends by which it is connected to the rods, the bends being close together on the rods and forming rows which extend along them and from the ends of which the rods project and extend to their supporting and guiding devices.

7. An elastic coupling embodying the combination of spring-holding and spring-flexing gear and a composite metal spring, which gear comprises a pair of parallel spring-holding rods and flat-faced rod-supporting and rod-guiding devices, the axes of the rods being perpendicular to the flat faces of said devices, and which spring consists of bent wire components each having at its ends rod-fitting bends by which it is connected to the rods, the bends being close together on the rods and forming rows which extend along them and from the ends of which the rods project and extend to their supporting and guiding devices.

8. An elastic coupling embodying the combination of spring-holding and spring-flexing gear and a composite metal spring, which gear comprises a pair of spring-holders and holder-supporting and holder-guiding devices, the spring-holders having parallel longitudinal axes, and which spring consists of differently stressed components severally supported at their ends by the spring-holders and arranged in a group that extends lengthwise of the spring-holders and projects from the plane that contains their said axes.

9. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and which spring is composed of bent components supported by the spring-holders and constituting symmetrical formations projecting from the plane that contains said axes and extending lengthwise of the spring-holders along and on opposite sides of that plane.

10. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and which spring is composed of two minor groups of bent components severally supported at their ends by the spring-holders, the two minor groups forming a major group embodying symmetrical formations that project from the plane containing said axes and extend lengthwise of the spring-holders along and on opposite sides of that plane.

11. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and which spring is composed of two minor groups of coiled wires severally supported at their ends by the spring-holders, the two minor groups constituting a major group the coils of which form rows that extend lengthwise of the spring-holders and along and on opposite sides of the plane that contains their said axes.

12. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and which spring consists of a group of coiled wires arranged in pairs and severally supported at their ends by the spring-holders, the coils of each pair being on opposite sides of the plane that contains said axes and being cut by a plane that cuts said axes at right angles and passes between the ends of each wire of the pair.

13. An elastic coupling embodying the combination of spring-holding and spring-flexing gear and a composite metal spring, which gear comprises a pair of relatively movable spring-holders and holder-supporting and holder-guiding means, the spring-holders having parallel longitudinal axes and said means forming parallel holder-guides, and a component of which spring is a pair of coiled wires each supported at its ends by the spring-holders, the coils being on opposite sides of the plane that contains said axes and being cut by a plane that cuts said axes at right angles and passes between the ends of each wire of the pair.

14. An elastic coupling embodying the combination of spring-holding and spring-flexing gear and a composite metal spring, which gear comprises a pair of relatively movable spring-holders and four flat-faced and longitudinally slotted bars the slots in which are straight and of equal length, the spring-holders having parallel longitudinal axes and each holder being confined near each of its ends in slots of two of the bars, said axes being perpendicular to the flat faces of the bars and the plane that contains those axes bisecting each slot longitudinally, and which spring consists of a group of coiled wires arranged in pairs and severally supported at their ends by the spring-holders, the coils of each pair being on opposite sides of said plane and being cut by a plane that cuts said axes at right angles and passes between the ends of each wire of the pair.

15. In an elastic coupling embodying a pair of relatively movable spring-holders having parallel longitudinal axes, the combination with the spring-holders of a pair of coiled elastic wires each supported at its ends by the spring-holders, the coils being on opposite sides of the plane that contains said axes and being cut by a plane that cuts the first mentioned plane at right angles and passes between the ends of each wire of the pair.

16. An elastic coupling embodying the combination of spring holding and spring-flexing gear and a composite metal spring, which gear comprises a pair of relatively movable spring-holders and holder-supporting and holder-guiding means, the spring-holders having parallel longitudinal axes, and which spring consists of wires each held at its ends on and supported by the spring-holders, which wires are close together on the spring-holders and compose symmetrical formations projecting from the plane that contains said axes, and the wires of each of which formations are close together.

DANIEL A. CARPENTER.